United States Patent [19]

Hart

[11] 4,063,369
[45] Dec. 20, 1977

[54] VISUAL COMMUNICATION TOOL FOR CHILDREN

[76] Inventor: Mary Louise Hart, 481 Dulles Road, Des Plaines, Ill. 60016

[21] Appl. No.: 640,622

[22] Filed: Dec. 15, 1975

[51] Int. Cl.² ............................................. G09B 19/00
[52] U.S. Cl. .................................. 35/35 E; 35/35 H; 281/31
[58] Field of Search ............................ 35/35 E, 35 H; 40/104.18, 125 A; 281/31

[56] References Cited

U.S. PATENT DOCUMENTS

| Re. 19,238 | 7/1934 | Burke | 40/125 A |
|---|---|---|---|
| 1,055,151 | 3/1913 | Emerson | 35/35 H |
| 1,405,134 | 1/1922 | Hoyme | 35/35 E |
| 1,524,647 | 2/1925 | Albrecht | 281/31 |
| 2,283,026 | 5/1942 | Yates | 40/104.18 |
| 2,293,887 | 8/1942 | Chamberlain | 40/125 A |
| 2,369,804 | 2/1945 | Schoolfield et al. | 35/35 H |
| 2,586,039 | 2/1952 | Heggedal | 40/125 A |
| 2,862,309 | 12/1958 | Von Der Hellen | 35/35 E |
| 3,654,711 | 4/1972 | Taylor | 35/7 A X |
| 3,839,130 | 10/1974 | Dean et al. | 35/7 A X |

FOREIGN PATENT DOCUMENTS

| 515,379 | 11/1952 | Belgium | 35/35 E |
|---|---|---|---|
| 843,030 | 8/1960 | United Kingdom | 35/35 E |

*Primary Examiner*—William H. Grieb
*Attorney, Agent, or Firm*—Alter and Weiss

[57] ABSTRACT

A visual communication tool for children in which non-worded expression can be displayed in pictorial form. By utilizing a series of provided figures, a child is capable of creating his own storybook so as to communicate his creativity to others through the pictorial display or with an accompanying explanation.

7 Claims, 9 Drawing Figures

VISUAL COMMUNICATION TOOL FOR CHILDREN

BACKGROUND OF THE DISCLOSURE

The present invention relates generally to educational and diagnostic communication devices and, more particularly, to a visual communication and diagnostic tool for children through which expression can be manifested as a pictorial story.

At present, several art-related vehicles for the development of a child's imagination and self-expression are available for use by a child's parents or teachers.

Among the expression, communication, and diagnostic devices available for young children or individuals with learning disabilities, are the drawing mediums of crayons, paints, finger paints, clay, paper collages, etc., all of which are utilized with the aim of enabling a youngster to communicate without utilizing written words. But, presented with these conventional and widely-used expression forms are certain drawbacks which the present invention greatly alleviates. These modes of communication, for example, require utilization by a child or individual of only a few of his senses, often ignoring, for example, the important utilization of an individual's tactile or touching sense. Similarly, through utilizing paints or drawing apparata, the child is unable to appropriately distinguish or perceive objects as they are being drawn on paper. At an early age, a child's need for appreciating perspective is similarly ignored by the majority of these tools. Similarly, most of these expression modes are not re-usable nor do they allow experimentation before the user's expression is finalized on paper, nor do the tools provide objects for the child to work with of which he may already be familiar, nor teach of new objects about which the child may not be familiar.

Only a few communication devices have evolved which utilize the placement of already provided objects onto a story background. Several educational tools, games, and art toys, for example, are provided today which give a child a small stationary background onto which objects may be placed. The present invention utilizes some of the basic concepts inherent with these types of devices as well as cutting and pasting, but — at the same time — goes further by providing a series of storytelling frames, enabling the child to tell a story with a series of backgrounds in a continuous progression in the same manner in which a book tells a story from page to page.

It is thus an object of the present invention to enable a child to utilize his tactile sense with a series of familiar story figures while at the same time providing the child's, or individual's, perception and perspective.

It is similarly an object of the present invention to provide a re-usable communication tool which allows experimentation in the placement of provided objects before these objects are positioned on a series of pages to tell a story. It is also an object of the present invention to foster creativity in and from the user while familiarizing the user with a myriad of objects and shapes and the size-ratios between these objects and shapes.

Additionally, it is an object of my visual communication tool to prompt the imagination of a child and educate him to portray certain social experiences in an environment of fun and enjoyment while familiarizing him with continuity of expression, and at the same time introducing him to the workings of books even before he is capable of reading and writing. The invention further prompts an individual's use of characters and scenery, promotes problem-solving, and improves hand-to-eye coordination as well as small motor control development.

In addition to these objects, it is an aim of my invention to develop good work habits for the user, and to prompt articulated communication by the child by eliciting an explained story associated with the pictorial story set forth in the invention, both as an educational tool and as a diagnostic tool. These and other advantages become apparent through the following disclosure.

SUMMARY OF THE INVENTION

The present invention is a visual communication tool for children. A binder maintains a plurality of display mounting leaves therein, in the same fashion a book, catalogue, or notebook restrains its pages within their covers. Thus, each of the display mounting leaves is accessible within the binder by simply pivotally turning over preceding leaves without the necessity of removal, from the binder, of other leaves. Component story figures, which are descriptive of various shapes and objects of things which are customarily encountered in life, are provided. These component story figures are affixed to the display mounting leaves within the binder so as to portray a story continuously from the first mounting leaf through the number of remaining mounting leaves used by the storyteller. Thus, each particular display mounting leaf upon affixation of the desired component story figures denotes an expression of the user without the use of words, with continuity from mounting leaf to mounting leaf in the same fashion that each frame of a multi-frame cartoon adds story progression to the cartoon itself.

The component story figures are manually overlaid on the display mounting leaves and, if necessary, on other component story figures. They are restrained to the mounting leaves and to one another, in order to keep the component story figures on the page when the book is moved and pages are turned, or to keep the story figures in place when the book is closed, thereby preventing the shifting of the figures from one page to another proximate page or set of story figures. The manner in which the figures are maintained on the pages and on one another is achieved through a particular selection of materials which have adhesion characteristics and which are discussed below.

A preferred embodiment of the invention utilizes a plurality of mounting pockets on the inside cover surface of both the back and front of the binder so as to provide a storage area into which loose component story figures are placed. These mounting pockets, while assisting in keeping all the story figures together with the rest of the invention, serve yet another purpose. The preferred embodiment of the invention utilizes alphabetical indicia on each of the several mounting pockets, indicia with which the child or user can become familiar and thus educated. For example, if one mounting pocket is designated with the alphabetic letter "f," this would clearly designate the pocket from which frogs, flowers, fish, fire, etc., would be obtainable from the mounting pocket to use in the expression activity, as well as the designated position to which these objects should be returned after use on the mounting display pages. In yet another embodiment, the indicia could be the actual spelled-out words having counterpart story figures, thereby giving each separate story figure its own separate mounting pocket in which to be stored. Obviously, the number of story figures supplied with the invention as well as the number of usable pocket spaces would influence the possibility of designating a separate pocket for each component story figure object.

The preferred embodiment of the present invention utilizes mounting leaves fabricated of a felt-like flannel material with component story figures fabricated from the same felt-like flannel material. Utilizing materials such as these imparts to the user, especially to infants and pre-school children, a soft yet thick tactile feel to each object which, when applied to the mounting leaves, yields a three-dimensional effect. This is due to the fact that the felt-like flannel material inherently has a substantial thickness and tactile characteristics, as well as being safe for handling. In such an embodiment, the component story figures are restrained in place on the display mounting leaves by the adhesion of one felt surface to another felt surface. Further, to promote the maintenance of the story figures in place on the particular mounting leaf, and to prevent the shifting of the story figures from one mounting leaf to another mounting leaf, or from its placement on another story figure to a different story figure, plastic partitions are provided between each one of the plurality of display mounting leaves. Thus, when the binder and mounting leaves are in the closed position, various story figures would not be detached from pages or figures onto which they were originally attached, preventing movement to yet other pages within the invention.

In yet another embodiment, display mounting leaves are fabricated from thin sheets of ferrous metal, capable of attracting and maintaining in place, magnetic objects. This embodiment further utilizes the component story figures fashioned from magnetic vinyl, therefore capable of being attracted to the ferrous metal sheet. The magnetic capabilities of the component story figures and the attraction characteristics of the metal mounting leaves, furnish restraining means which magnetically maintain the component story figures in place on the display leaves.

In yet another embodiment, the display mounting leaves are non-porous, smoothly surfaced pages, and the component story figures are thin, pliable plastic shapes, similar to plastic film, which, through adhesion, can be mounted and maintained on the mounting leaves which are provided. In this embodiment as well as the others, colors and descriptive features can be imparted to each of the component story figures through conventional manufacturing means.

It is important to remember that the present invention can be utilized as a communication tool for pre-school children, both before and after the concepts of reading and writing are mastered, as well as a diagnostic tool by counsellors and technicians on people of all ages. As such, it is possible to use the desirable feature of providing story figures pertaining to a particular theme or subject, thus limiting the scope of expression for the user. For example, as a diagnostic tool, if a counsellor is attempting to determine the familial relationship of an individual having a learning disability, the component story figures which would be provided with the invention would be in shapes and representations associated with family life. Thus, a series of outdoor scene story components would not be included, but the component story figures would be limited to persons and objects customarily found in the home, such as family members, pets, and ordinary house furnishings, so that the scope of expression and the elicited responses would be narrowed.

DETAILED DESCRIPTION OF THE DRAWINGS

Figure 1:
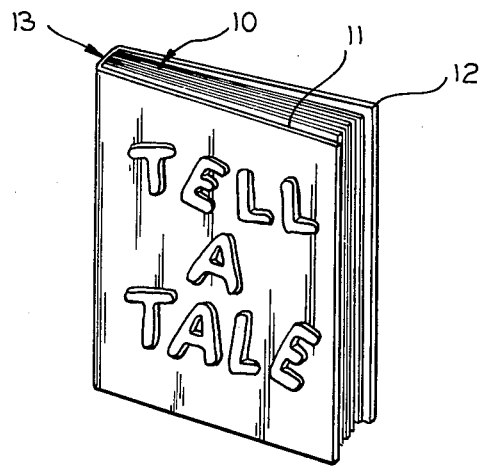
FIG. 1 is a side perspective view of the invention with its binder in a closed position.

While this invention is susceptible of embodiment in many different forms, there are shown in the drawings and will herein be described in detail, three specific embodiments with the understanding that the present disclosure is to be considered as an exemplification of the principles of the invention and is not intended to limit the invention to the embodiments illustrated.

An overall view of the visual communication tool 10 is shown in FIG. 1 particularly displaying binder 13 formed by front cover 11 and rear cover 12. In this particular embodiment, the binder utilizes standard book binding techniques to restrain its contents but it should be recognized that binder rings or spiral backbones could be substituted with the same overall effect.

Figure 2:
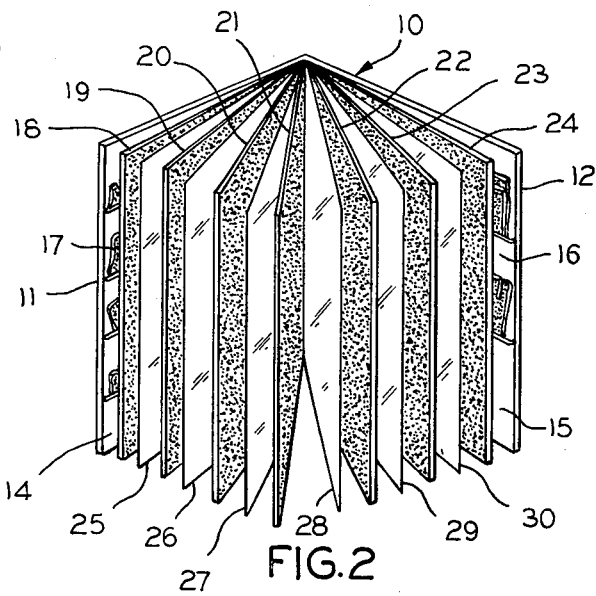
FIG. 2 is a front perspective view of one embodiment of the invention showing particularly the placement of display mounting leaves within the invention's binder.

In FIG. 2 of the drawings, communication tool 10 is shown in a partially open view so as to illustrate adequately the display mounting leaves 18 through 24 as well as front and rear binder covers 11 and 12 respectively. In this particular embodiment of the invention, display mounting leaves are fabricated of a flannel, felt-like material which not only provides attachment means for the similarly fabricated component story figures but also provides a safe, soft environment in which smaller children can work without danger of cutting themselves on sharp pages or jagged corners. Partially shown in FIG. 2 also is the inside surface 14 of front cover 11, illustrating the positioning of mounting pocket 17. Likewise, the inside surface 15 of rear cover 12 is shown displaying typical mounting pocket 16 is attached thereon. Because this particular embodiment utilizes both display mounting pages and component story figures fabricated from a flannel, felt-like material, the invention has been provided with a series of plastic partitions 25 through 30 which are spaced between each of the display mounting leaves to prevent shifting of figures attached on one page, to another page, when the invention and binder are in a closed position.

Figure 3:
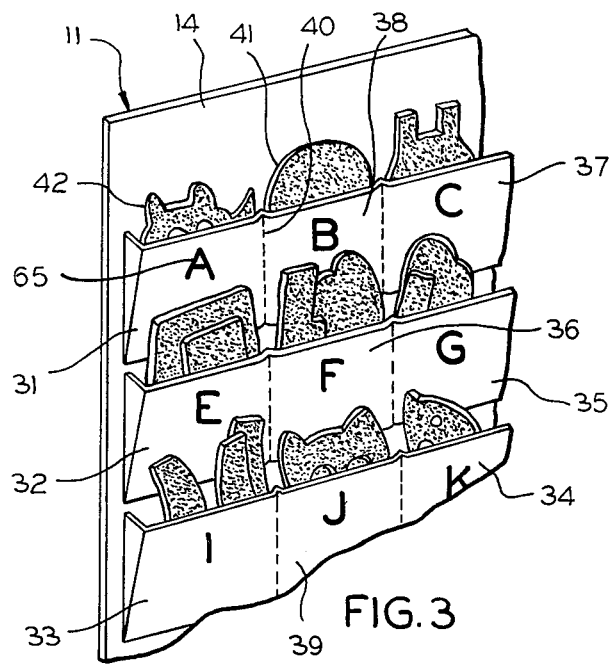
FIG. 3 is a side perspective close-up view of the interior surface of the front cover, showing particularly the invention's mounting pockets.

A close-up illustration of the inside surface 14 of front cover 11 as shown in FIG. 3 more clearly shows mounting pockets 31 through 39 as they have been attached to inside surface 14. As can be seen, the mounting pockets can be separated either by stitching or by attaching the edges of one to another so as to form individual pockets in a row, or can, at more expense, be attached pocket by pocket separately to the inside surface. In FIG. 3 it can be seen that stitching 40 separates the first two pockets in the upper left-hand corner of the inside surface 11. Pockets 31 through 39 themselves serve a dual function by providing a position on the invention for the user of the invention to store the component story figures such as those shown by component story figures 41 and 42 while at the same time prompting the user of the invention to associate the component story figures used with the correct alphabetic indicia, as shown by alphabetic indicia 65. It can be seen that either a letter on an individual pocket, such as "A" in indicia 65 or an alphabetic word even more descriptively associating the pocket location with the figure which will occupy that position, can be used. Thus the pockets also serve to educate the user by calling upon the user to utilize the correct pocket for the placement of an associated story figure.

Figure 4:
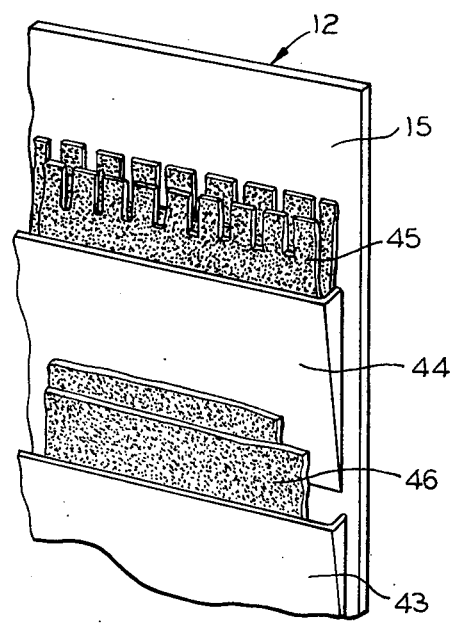
FIG. 4 is a perspective close-up view of the interior portion of the rear cover, showing additional mounting pockets.

The interior surface of the rear cover of the binder can also be utilized to provide mounting pockets such as shown in FIG. 4 in which the interior surface 15 of rear cover 12 has had mounting pockets 43 and 44 attached so as to provide storage for component story FIGS. 45 and 46.

Figure 5:
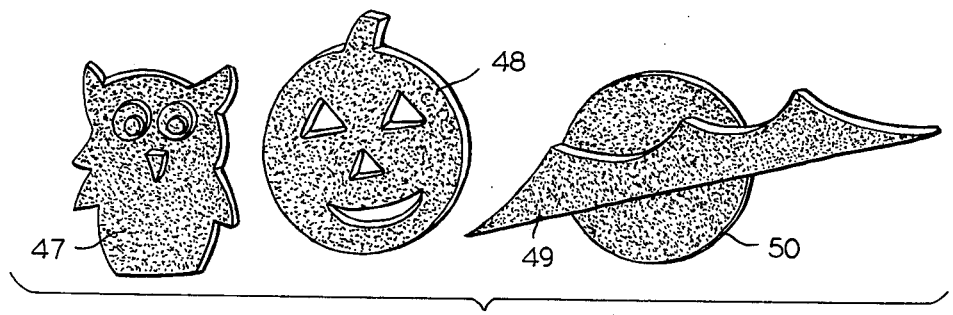
FIG. 5 is a side perspective view of several component story figures pertaining to one particular theme.

An example of a few of the numerous component story figures which can be used with the invention are shown by story FIGS. 47 through 50 in FIG. 5. These particular story figures are fabricated of flannel, felt-like material as suggested in the preferred embodiment previously discussed. As can additionally be realized, these figures more or less, as illustrated, follow one particular theme; here, things associated with Hallowe'en. While the component story figures for any given embodiment of the invention can include many general figures representing objects encountered in everyday life, the invention can be made to include only those objects pertaining to a particular theme in order to limit the area in which expression is being elicited from the user. Thus, when being used as a diagnostic tool, the invention will only include story figures touching upon a particular theme in which expression is specifically sought by the user. Additionally, the properties of dimension and tactile fabrication of the component story figures enable the invention to be usable by blind individuals as a diagnostic tool or as a means of pictorial expression. As can be realized, the blind being more familiar with and dependent upon their sense of touch, should find little difficulty in utilizing the invention as a means of expression.

Figure 6:
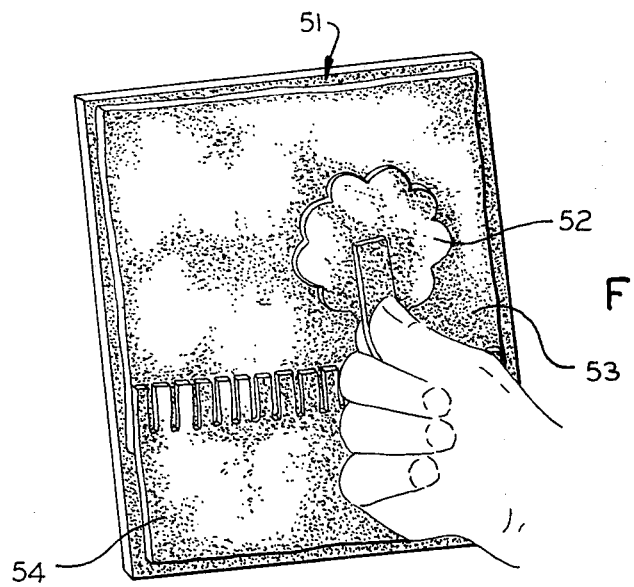
FIG. 6 is a side perspective view showing the present invention in use.

Display mounting leaf 51 is shown in use in FIG. 6 wherein a user in constructing one page of a several-page story, manually places background and object story figures onto the leaf in an attached fashion. In this manner, the component FIG. 52 representing a tree has been affixed to story FIG. 53 representing the horizon and story FIG. 54 representing grass. By the placement of FIG. 52 onto story leaf 51, the user is not confined to an original positioning of the story figure but rather can experiment by placing the figure in any one of a number of positions before finally leaving it in the position he finds most desirable.

Figure 7:
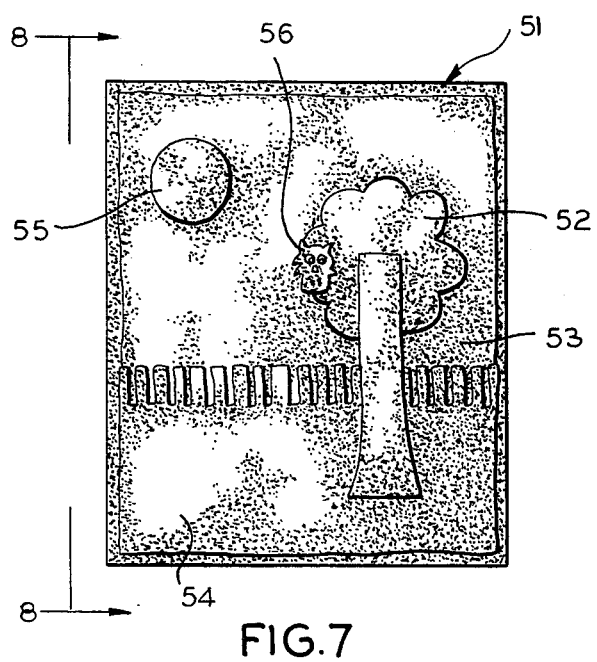
FIG. 7 is a front elevational view of one display mounting leaf onto which component story figures have been attached.
Figure 8:
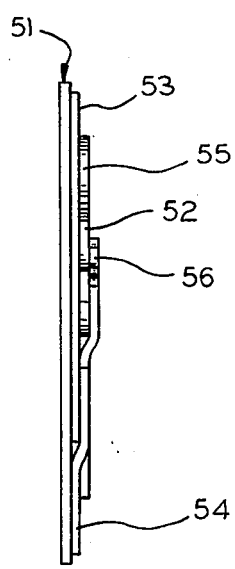
FIG. 8 is a side elevational view of the display mounting leaf shown in FIG. 7 taken along line 8—8 and looking in the direction of the arrows.

A sample of one finished leaf of an overall continuing story of leaves is shown in FIGS. 7 and 8, wherein leaf 51 has had attached background story FIGS. 53 and 54 as well as object story FIGS. 52, 55 and 56 on mounting leaf 51. These component story figures have depth to them as well as a particular size ratio so as to give the finished leaf a three-dimensional feeling while imparting to the user conceptions of tactile contact as well as perspective.

Figure 9:
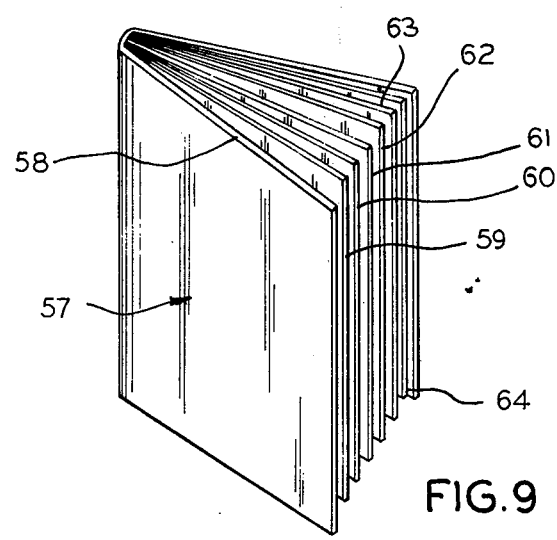
FIG. 9 is a side perspective view of a second embodiment of the present invention in which the display mounting leaves are fabricated of a smooth, non-felt material.

A second and third embodiment of the invention are shown in FIG. 9, in which visual communication tool 57 having a binder with front cover 58 and rear cover 64 is shown. In this embodiment, display mounting leaves 59 through 63 have a smooth surface making them adaptable for attachment by pliable, film-like, plastic objects. Further, if these display mounting leaves are fabricated of a ferrous metallic substance, component story figures of magnetic vinyl would be capable of being used in the same manner as herein described.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A visual communication tool for children comprising:
    a binder means having a front cover, a rear cover and cover attachment means attaching said front cover to said rear cover,
    a plurality of display mounting leaves mounted in said binder means,
    said display mounting leaves being pivotally constrained within said binder means, thereby enabling access to any one of said plurality of leaves without removal from said binder means;
    each of said display mounting leaves providing an unobstructed area in which a user may assemble one or more component story figures as desired;
    component story figures which are placed on said unobstructed areas of said mounting leaves to illustrate a story as composed by the user of said tool;
    each of said component story figures having a distinct shape representative of a particular story figure without alphabetical indicia,
    said plurality of said display mounting leaves and said component story figures portraying a schematic expression continuously from the first of said mounting leaves through the remainder of said mounting leaves as needed within said binder means;
    restraining means for securely attaching said component story figures to said plurality of display mounting leaves and for enabling overlapping attachment of component story figures to one another, thereby maintaining said figures in place on said leaves when the binder is open or closed until said component story figures are manually removed by said user from said mounting leaves;
    a plurality of mounting pockets on said binder means in which said component story figures are stored before placement on said display mounting leaves and after removal of said story figures from said mounting leaves, said mounting pockets having indicia associated with said story figures thereby indicating which of said mounting pockets is to contain one of said story figures, said mounting pockets being mounted on the inside surfaces of one or more of said front and rear covers respectively, said component story figures having shapes and representing objects which follow one particular theme, thereby limiting the story sequence to a particular topic as expressed by the user.

2. The invention according to claim 1 in which said display mounting leaves are fabricated of felt flannel material;

said component story figures are fabricated from felt flannel material; and said restraining means comprises felt to felt surface adhesion of said story figures to said mounting leaves.

3. The invention according to claim 2 in which plastic partitions are provided between each of said plurality of said display mounting leaves, thereby maintaining said story figures in place and preventing the shifting of said story figures from one mounting leaf to another mounting leaf when said binder means is in the closed position.

4. The invention according to claim 1 in which said display mounting leaves are fabricated from thin sheets of ferrous metal;

said component story figures comprising shaped objects of magnetic vinyl having properties which produce attraction to ferrous metal; and said restraining means comprising the magnetic attraction between said display leaves and said component story figures.

5. The invention according to claim 1 in which said display mounting leaves comprise non-porous, smoothly surfaced pages;

said component story figures comprise thin, pliable plastic shapes; and said restraining means comprise surface adhesion between said plastic shapes and said non-porous surfaces of said mounting leaves.

6. The invention according to claim 1 in which said indicia on said mounting pockets comprise individual letters of the alphabet, each of which is positioned on a respective mounting pocket.

7. The invention according to claim 1, in which said indicia comprise single words correlating to the component story figure to be placed therein and positioned onto each of said mounting pockets.

* * * * *